United States Patent
Olvera-Hernandez et al.

(10) Patent No.: US 10,194,359 B2
(45) Date of Patent: *Jan. 29, 2019

(54) METHOD AND SYSTEM FOR STATION LOCATION BASED NEIGHBOR DETERMINATION AND HANDOVER PROBABILITY ESTIMATION

(71) Applicant: InterDigital Technology Corporation, Wilmington, DE (US)

(72) Inventors: Ulises Olvera-Hernandez, Montreal (CA); Alan G. Carlton, Mineola, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/357,554

(22) Filed: Nov. 21, 2016

(65) Prior Publication Data
US 2017/0070927 A1 Mar. 9, 2017

Related U.S. Application Data

(63) Continuation of application No. 14/610,462, filed on Jan. 30, 2015, now Pat. No. 9,503,954, which is a (Continued)

(51) Int. Cl.
*H04W 36/00* (2009.01)
*H04W 36/32* (2009.01)
(Continued)

(52) U.S. Cl.
CPC ....... *H04W 36/0083* (2013.01); *H04W 36/08* (2013.01); *H04W 36/32* (2013.01);
(Continued)

(58) Field of Classification Search
None
See application file for complete search history.

(56) References Cited

U.S. PATENT DOCUMENTS 5,867,763 A 2/1999 Dean et al.
6,052,598 A 4/2000 Rudrapatna et al.
(Continued)

FOREIGN PATENT DOCUMENTS

GB 2397468 7/2004
KR 04/104145 12/2004
(Continued)

OTHER PUBLICATIONS

Gupta, Vivek. "Global Network Neighborhood Presentation." IEEE 802.21 Media Independence, May 2004.

*Primary Examiner* — Erika A Washington
(74) *Attorney, Agent, or Firm* — Volpe and Koenig, P.C.

(57) ABSTRACT

The present invention is a method and system for station location based neighbor determination and handover probability estimation. A serving access point determines the location and movement measurements of a station (STA). Neighboring access points report coordinates of cell fringes of the neighboring access points. The STA sends a request for system information to the current access point along with current location of the STA. The current access point provides the system information, and the STA utilizes the system information to determine best handover candidate from among neighboring access points and an estimate of the time for handover.

12 Claims, 2 Drawing Sheets

Related U.S. Application Data continuation of application No. 13/463,490, filed on May 3, 2012, now Pat. No. 8,971,293, which is a continuation of application No. 11/372,762, filed on Mar. 10, 2006, now abandoned.

(60) Provisional application No. 60/660,963, filed on Mar. 11, 2005.

(51) Int. Cl.
*H04W 36/08* (2009.01)
*H04W 64/00* (2009.01)
*H04W 36/36* (2009.01)
*H04W 4/02* (2018.01)

(52) U.S. Cl.
CPC ............ *H04W 64/003* (2013.01); *H04W 4/02* (2013.01); *H04W 36/36* (2013.01)

(56) References Cited

U.S. PATENT DOCUMENTS

| | | |
|---|---|---|
| 6,275,703 B1 | 8/2001 | Kalev |
| 6,327,471 B1 | 12/2001 | Song |
| 6,381,463 B1 | 4/2002 | Tu et al. |
| 6,522,888 B1 | 2/2003 | Garceran et al. |
| 6,564,057 B1 | 5/2003 | Chun et al. |
| 6,711,408 B1 | 3/2004 | Raith |
| 6,745,034 B2 | 6/2004 | Wang et al. |
| 7,181,221 B1 | 2/2007 | Mark et al. |
| 8,971,293 B2 * | 3/2015 | Olvera-Hernandez ..................... H04W 36/32 370/331 |
| 9,503,954 B2 * | 11/2016 | Olvera-Hernandez ..................... H04W 36/32 |
| 2002/0049058 A1 | 4/2002 | Tee |
| 2002/0098840 A1 * | 7/2002 | Hanson ................... H04L 1/188 455/435.3 |
| 2004/0023669 A1 * | 2/2004 | Reddy ................... H04W 36/32 455/456.1 |
| 2004/0097234 A1 | 5/2004 | Rajkotia et al. |
| 2004/0176024 A1 | 9/2004 | Hsu |
| 2004/0192307 A1 * | 9/2004 | Watanabe ............. H04W 36/32 455/436 |
| 2004/0199616 A1 | 10/2004 | Karhu |
| 2005/0213545 A1 * | 9/2005 | Choyi .................... H04L 45/00 370/338 |
| 2006/0199591 A1 | 9/2006 | Klatt |
| 2007/0135134 A1 | 6/2007 | Patrick |
| 2008/0146232 A1 | 6/2008 | Knisely |

FOREIGN PATENT DOCUMENTS

| | | |
|---|---|---|
| WO | 01/30090 | 4/2001 |
| WO | 06/19269 | 2/2006 |

* cited by examiner

METHOD AND SYSTEM FOR STATION LOCATION BASED NEIGHBOR DETERMINATION AND HANDOVER PROBABILITY ESTIMATION

CROSS REFERENCE TO RELATED APPLICATION

This application is a continuation of U.S. patent application Ser. No. 14/610,462, filed Jan. 30, 2015, which issued as U.S. Pat. No. 9,503,954 on Nov. 22, 2016, which is a continuation of U.S. patent application Ser. No. 13/463,490, filed on May 3, 2012, which issued as U.S. Pat. No. 8,971,293 on Mar. 3, 2015, which is a continuation of U.S. patent application Ser. No. 11/372,762, filed on Mar. 10, 2006, abandoned, which claims the benefit of U.S. Provisional Application No. 60/660,963, filed on Mar. 11, 2005, which are incorporated by reference as if fully set forth.

FIELD OF INVENTION

The present invention is related to wireless communication system. More particularly, the present invention is a method and system for station location based neighbor determination and handover probability estimation.

BACKGROUND

Integration of wireless local area networks (WLANs) with other wireless access technologies has become increasingly important among the various standards that develop wireless access technologies. Handover mechanisms and procedures that might allow seamless delivery of services across heterogeneous networks are of prime importance towards multi-technology integration.

In particular within IEEE standards, 802.21 has been tasked with providing mechanisms and notification that enable other technologies to react quickly to changing conditions within the WLAN network itself. These notifications provide details with regard to the current state of the WLAN or access technology supplying a service.

Link quality, (e.g., received signal strength indicator (RSSI), bit error rate (BER), packet error rate (PER)), link capabilities to support a particular service, (e.g., voice or high speed data), and details on the service provider that delivers the service are examples of the information that 802.21 can provide. This information allows existing mobility management mechanisms to set up alternate access resources in order to continue the delivery of services with the same or similar level of quality as originally requested by the user.

It is important to note that it is up to an access technology to determine the course of action to follow, at the upper layer, upon receipt of the notification and triggers. However, in order to avoid the so-called "ping-pong" effect, notifications hinting the need for a handover need to provide a validity period and action time that will allow the upper layer function to determine when the handover needs to occur.

In general handovers are triggered using two main criteria. Either the current link is no longer suitable or a better candidate has been found. Handover across heterogeneous networks entails determining the best candidate across all available access technologies within a region.

There are current proposals addressing selection and discovery of handover candidates that base their criteria on measurements and information centrally stored in the access point. Information is stored in the form of neighboring maps that provide a snap shot of the network and associate this information to different zones. This poses a problem as measurements are taken from the access point's perspective and not from the client station's perspective. This is particularly problematic when the base station or access points are moved frequently, as maps are not updated that frequently.

Although measurements and settings are kept centrally at the access point, the handover decision might be made at the client station (STA). However, said current proposals do not take into consideration measurements taken at the STA, even thought the STA itself is in the best position to measure on prospective candidates for handover.

Therefore, it would be desirable to provide a method and system for station location based neighbor determination and handover probability without the limitations of the prior art.

SUMMARY

The present invention provides a method and system to estimate the best possible neighbor to handover to when the current link is no longer suitable to provide a service. The method and system also estimates the expected time at which a handover is to be executed within a particular cell and determines the degree of certainty that handover will occur towards a particular cell.

BRIEF DESCRIPTION OF THE DRAWINGS

A more detailed understanding of the invention may be had from the following description of a preferred example, given by way of example and to be understood in conjunction with the accompanying drawing wherein.

DETAILED DESCRIPTION OF THE PREFERRED EMBODIMENTS

Hereafter, a station (STA) includes but is not limited to a user equipment, a wireless transmit/receive unit, a fixed or mobile subscriber unit, a pager, or any other type of device capable of operating in a wireless environment. When referred to hereafter, an access point (AP) includes but is not limited to a Node-B, a site controller, a base station or any other type of interfacing device in a wireless environment.

Figure 1:
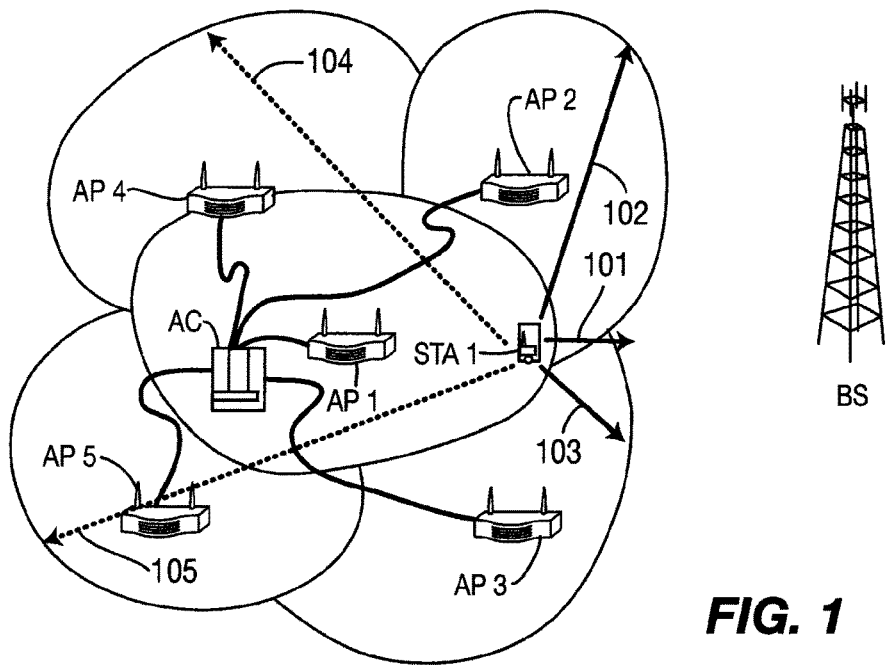
FIG. 1 shows a scheme of station location-based neighbor determination in accordance with the present invention.

FIG. 1 shows a wireless local area network (WLAN) 100 of multiple access points AP1, AP2, AP3, AP4 and AP5, an access controller AC, a base station BS and a target station STA1. The handover method described herein is also applicable in heterogeneous networks such that surrounding access points and/or base stations in the vicinity of station STA1 belong to different networks rather than a common network as with WLAN 100. In accordance with the present invention, the handover decision is preferably based on knowledge of the target station STA1 with respect to the direction of its movement, the position of the target station STA1 relative to its currently associated access point AP1 and neighboring candidate access points AP2-AP5, and the measurements reported from both the target station STA1 and by historical measurements of other STAs that once were located at or near the same coordinates.

A preferred method of STA location-based neighbor determination in accordance with the present invention will be described in reference the network 100. Initially, the mobile station STA1 is associated with access point AP1. The direction of motion 101 is away from the access point AP1 and at the edge of AP1's cell. At this location, a handover of the station STA1 is necessary so that its communication link to the network remains unbroken. To facilitate handover, an access controller (AC) or any other central entity controlling the APs in the WLAN assesses the speed and direction of the station STA1's movement, determines the locations of handover candidate APs or base stations, and determines the probability that STA1 is approaching the boundary of the cell, and therefore the need for handover.

The metrics regarding the speed and direction of the station STA1's movement are preferably measured as a function of explicit geographical location and signal strength measurements from different APs and BSs. The metric regarding the location of the candidate APs and BSs is measured as a function of the signal strength received at both the target station STA1 and the current access point AP1. The AC gathers information about the current location of the APs within the WLAN. Each access point AP1-AP5 performs measurements of its current location for reporting to the access controller AC or other central entity. Each access point AP1-AP5 also performs measurements of transmitted signals and received signals to determine its cell boundary. These measurements may be performed with assistance from GPS. The access points AP1-AP5 store the information for reference by other network entities, such as the access controller AC and the target station STA1. The location and cell boundary measurements by each access point AP1-AP5 are preferably made on a periodic basis to account for any repositioning of the access point that may occur either deliberately or inadvertently. Based on the STA1 metrics and the AP1-AP5/BS metrics, the access controller AC assists the station STA1 in selection of the best candidate for handover from the access point AP1.

Alternatively, the cell boundaries are determined with the assistance of neighboring network stations. For simplicity, FIG. 1 shows only the target station STA1. However, the network may include a plurality of additional stations located within one or more of the cells of access points.

According to the present invention, any of these additional stations within the network report their measurements on their current connection, including received signal strength and link quality (e.g., bit error rate (BER)). From these reported measurements, the access controller AC determines an estimate of the boundary locations of all the cells in the WLAN and the distance from these cell boundaries and the current location of the target station STA1 at any point within the network. In a mobile environment where the stations and/or the access points are not stationary, measurements may be taken as frequently as the movement itself demands. This includes fixed periodic measurements, and measurements triggered by the movement itself. With this assistance of the neighboring stations, the target station STA1 now has accurate location information available to it provided by the access controller AC, so that the handover from access point AP1 to the best candidate access point is improved. Furthermore, power consumption is reduced thereby conserving battery resources. The above measurements of access point AP1-AP5 location and their respective cell boundaries can also be made for surrounding base station BS and any other network entity.

The access controller AC communicates the network topology information for WLAN 100, such as the location and the cell boundary information of the access points AP1-AP5 and the base station BS, to the target station STA1 and any other mobile or stationary stations within the WLAN 100. To receive this information, the target station STA1 requests the network topology information from the access controller AC at system access or as required by the station STA1. Along with the request, the station STA1 may provide its current location coordinates. The station STA1 knows its own location based on both GPS and the network map provided by the network. The network map provides detail on the network topology that can help calculate its location by triangulation, for example.

Alternatively, the serving access point AP1 may use an estimate of the station STA1's current position using radio propagation information. One example of a technique utilized by the AP1 for this step involves retrieving GPS coordinates from the station STA1 and tracking the change of these coordinates over time to determine directional information and the position of the station STA1. This is then used to estimate the expected time until the station STA1 will reach the cell boundary and at which point handover will be required to commence.

After the initial report of the WLAN topology information provided by the access controller AC is delivered to the station STA1, subsequent updates of the information are provided to accommodate the mobility of the station STA1. These updates may be periodic or upon request by the station STA1. The station STA1 may request updates from the access controller AC as movement is detected and signal quality thresholds are crossed. The frequency of requests preferably depends upon the time the last topology update was retrieved and the speed and direction of the movement. The station might detect its own movement based on GPS and measurements from other access points AP2-AP5 and current access point AP1. The AC or other network entity might calculate the station STA1's movement based on measurements coming from the station STA1. The WLAN topology information received by the station STA1 is based on the current position of the station STA1. As the station STA1 moves toward the outside boundary of the current cell, the station STA1 uses the topology information and knowledge of current movement, including its speed and direction of its movement to determine the probability to reach the boundary of a particular candidate cell. The probability refers to how quickly the station STA1 will reach the cell boundary for AP1 within a predefined time. For example, it may be estimated that the station STA1 will reach the cell boundary within 5 ms with 95% probability. This is calculated by sampling speed and direction at specific intervals along with knowledge of the distance to the cell boundary.

Figure 2:
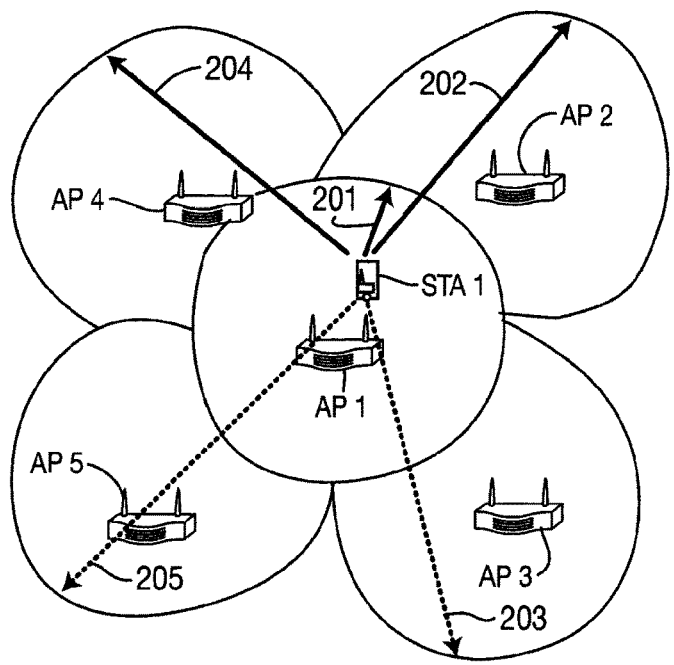
FIG. 2 shows a scheme of handover based on station location information in accordance with the present invention.

FIG. 2 shows a WLAN 200 comprising several access points AP1, AP2, AP3, AP4 and AP5 with a mobile station STA1. In this second embodiment, handover of the station STA1 is achieved without the assistance of an access controller. The following example describes a location based handover according to this second embodiment. Initially, the station STA1 is associated with the access point AP1. The geographical position of the station STA1 along with its direction of movement is determined by the access point AP1 similar techniques as described above in reference to FIG. 1.

Concurrently, the neighboring access points AP2, AP3, AP4 and AP5 report their estimates of the location of their cell boundaries. Under this embodiment, the station STA1 is able to detect and receive signals from the neighboring access points AP2-AP5 as the station STA1 approaches their cell boundaries. The station STA1 is able to read this information during so called silent periods. Thus, the station STA1 obtains the cell boundary information directly from the network without the central access controller intervention. In addition, the access point AP1 can read signals of the other access points AP2-AP5. While the access points AP1-AP5 may not necessarily report to each other, the access point AP1 can report to the station STA1 the cell boundary information read by AP1 from the access points AP2-AP5. Preferably, four geographical coordinates of each cell are provided (e.g., S, N, E, W coordinates). Alternatively, additional coordinates may be provided for better resolution of the cell boundary. If the access points AP1-AP5 are mobile, the cell fringe estimates are updated on a periodic basis. The access points AP1-AP5 may use the assistance of GPS technology for deriving the coordinates.

The station STA1 requests WLAN 200 topology information from the serving access point AP1 either at system access or as needed. The request provides the station STA1's current location coordinates and measurements of signal strength received from the serving access point AP1. Optionally, the request provides measurements made with respect to received signals from the access points AP2-AP5, and/or measurements made by the access points AP1-AP5 of each other.

The initially serving access point AP1 determines probability for the station STA1 to reach the cell boundaries of the neighboring access points AP2-AP5 for handover, using metrics as described above in reference to FIG. 1. The serving access point AP1 associates a weighting factor for the accessible neighboring access points AP2-AP5 so that the station STA1 can select the best handover candidate. Based on the weighting factor, the handover candidates AP2-AP5 are ranked in order of probability of a successful handover with unbroken communication link. Alternatively, the access point AP1 provides WLAN 200 network topology information, such as access point location and quality of signal, and the STA1 performs the calculation necessary to estimate the distances to the cell boundaries of the neighboring access points AP2-AP5 and thereby select the best candidate for handover.

In addition to determining the best handover candidate, the time when a handover is likely to happen is also calculated by either the access point AP1 or the station STA1. This handover timing is estimated according to the proximity of the cell boundary of each handover candidate access point as well as the direction and speed of the mobile station STA1 as it approaches each respective handover candidate cell boundary.

As the serving access point AP1 determines the weighting factors, each factor may be adjusted and tuned based on the received signal quality of neighboring access points AP2-AP5 as measured by the station STA1 and as reported by the station STA1 to the access point AP1. The station STA1 may take these measurements of the access points AP2-AP5 during periods when the station STA1 is not transmitting to the access point AP1.

Figure 3:
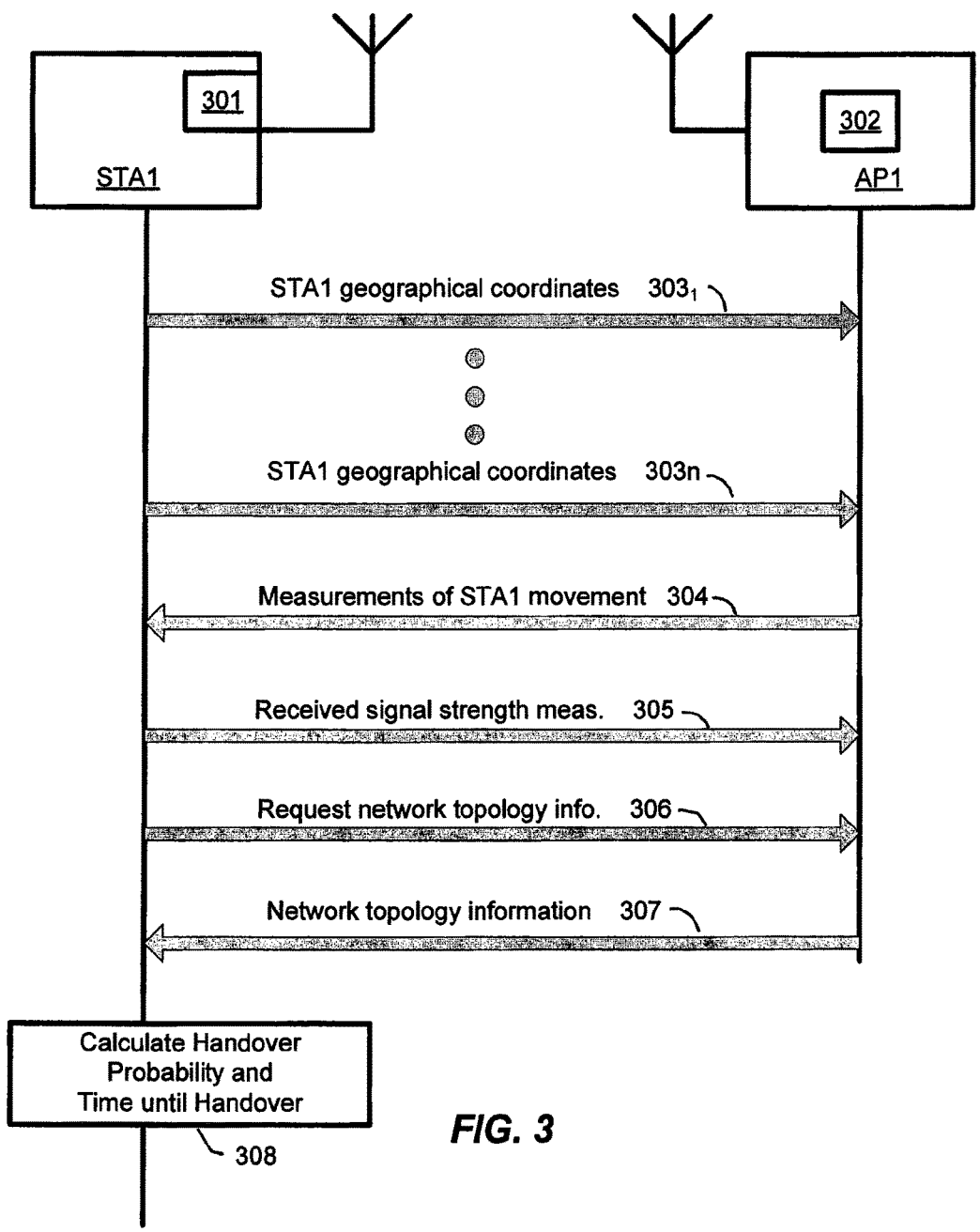
FIG. 3 shows a signaling diagram for measurement message exchanges between a serving access point and a station for handover decision calculations.

FIG. 3 shows a signaling diagram for measurement message exchanges between station STA1 and serving access point AP1. Station STA1 comprises a measurement processor 301 and access point AP1 comprises a measurement processor 302 for making the following measurements used for the handover probability and estimated time until the expected handover. Upon determining its geographical location coordinates using GPS, station STA1 reports the coordinates to the access point AP1 at successive messages $303_1$ to $303n$. Based on the multiple location coordinates, the serving access point AP1 tracks the motion of the station STA1 to calculate the speed and direction of the station STA1 and reports the results back to the station STA1 at message 304. Station STA1 also reports received signal strength measurements with respect to neighboring access points AP2-AP5 at message 305. The station STA1 requests the network topology information at message 306, which includes cell boundary definitions for the neighboring access points AP2-AP5. Based on the received signal strength measurements, the serving access point AP1 updates the network topology information, and reports it back to the station STA1 at message 307. Using the network topology information and the movement measurements received by the station STA1, calculation 308 is performed to determine the probability for handover to any particular neighboring access point AP2-AP5 and the estimated time that such a handover will occur.

The present invention is applicable to any wireless communication system including, but not limited to, IEEE 802 technologies, cellular standards such as 3GPP or 3GPP2, and other standardized or proprietary wireless technologies similar to IEEE 802 WLANs, including 802.15 Bluethooth, HIPERLAN/2, etc. More particularly, the applicable IEEE 802 technologies include:
  WLAN baseline air interface standards:
    802.11 baseline
    802.11a OFDM 5 GHz WLAN
    802.11b HR-DSSS 2.4 GHz WLAN
    802.11g OFDM 2.4 GHz WLAN
    802.11j OFDM 10 MHz option WLAN
    802.11n High-Throughput WLAN
  WLAN standards supplements to extend operation for particular scenarios:
    802.11e QoS extensions (including WMM and WMM/2 brands)
    802.11s ESS Mesh
    802.11k Radio Resource Measurement
    802.11v Wireless Network Management
    802.21 Media Independent Handover The present invention may be implemented in any type of wireless communication system, as desired. By way of example, the present invention may be implemented in any type of 802 type system, including but not limited to 802.11, 802.16 and 802.21 or any other type of wireless communication system. The present invention may also be implemented as software, middleware or application-based. The invention is applicable to the data link layer, the network layer and transport layer of a wireless communication system or device.

Although the features and elements of the present invention are described in the preferred embodiments in particular combinations, each feature or element can be used alone without the other features and elements of the preferred embodiments or in various combinations with or without other features and elements of the present invention.

What is claimed is:
1. A method for an access controller (AC), comprising:
  receiving, by the AC, reports from a plurality of wireless devices, wherein each report includes geographic location information of each wireless device;
  maintaining network topology information, by the AC, based on the reports from the plurality of wireless devices; and providing network topology information to at least one wireless device in response to receiving a request for information.

2. The method of claim 1, wherein the plurality of wireless devices comprise one or more wireless transmit/receive units (WTRUs) or one or more access points (APs).

3. The method of claim 2, wherein the reports include information associated with a location of the APs based on measurements from the WTRUs.

4. The method of claim 2, wherein a first report of the plurality of reports is from the WTRU and the first report is received through a cellular radio access technology (RAT).

5. The method of claim 1, wherein each report includes the speed of a wireless device.

6. The method of claim 1, further comprising providing a map relating to the network topology information.

7. An access controller (AC) configured to:
receive reports from a plurality of wireless devices, wherein each report includes geographic location information of each wireless device;
maintain network topology information based on the reports from the plurality of wireless devices; and
provide network topology information to at least one wireless device in response to receiving a request for information.

8. The AC of claim 7, wherein the plurality of wireless devices comprise at least a wireless transmit/receive unit (WTRU) or an access point (AP).

9. The AC of claim 8, wherein each report includes the speed of a wireless device.

10. The AC of claim 7, wherein the reports are received periodically over time.

11. The AC of claim 7, wherein a first report of the plurality of reports is from a WTRU and the first report is received through a cellular radio access technology (RAT).

12. The AC of claim 7, further configured to provide a map relating to the network topology information to the WTRU.

* * * * *